United States Patent

Eckardt et al.

[11] Patent Number: 6,143,237
[45] Date of Patent: *Nov. 7, 2000

[54] METHOD AND APPARATUS FOR PRODUCING PLASTIC OBJECTS WITH SOLID SECTIONS AND HOLLOW SECTIONS

[75] Inventors: Helmut Eckardt, Meinerzhagen; Jürgen Ehritt, Hilchenbach; Alfons Seuthe; Michael Gosdin, both of Meinerzhagen, all of Germany

[73] Assignee: Battenfeld GmbH, Germany

[*] Notice: This patent is subject to a terminal disclaimer.

[21] Appl. No.: 09/067,887

[22] Filed: Apr. 28, 1998

Related U.S. Application Data

[63] Continuation of application No. 08/677,826, Jul. 10, 1996, Pat. No. 5,776,412.

[30] Foreign Application Priority Data

Aug. 31, 1995 [DE] Germany ................ 195 32 243

[51] Int. Cl.[7] .................. B29D 22/00; B29C 49/06; B29C 45/00
[52] U.S. Cl. ............... 264/572; 425/130; 425/135; 264/40.1; 264/40.5
[58] Field of Search .................. 264/572, 40.1, 264/40.5; 425/130, 135

[56] References Cited

U.S. PATENT DOCUMENTS

| | | | |
|---|---|---|---|
| 2,337,550 | 12/1943 | Crosby | 18/59 |
| 4,101,617 | 7/1978 | Friederich | 264/93 |
| 5,304,341 | 4/1994 | Shah | 264/572 |
| 5,417,916 | 5/1995 | Ladney | 264/572 |
| 5,423,667 | 6/1995 | Jaroschek | 264/572 |
| 5,534,216 | 7/1996 | Kamiyama | 264/572 |
| 5,612,067 | 3/1997 | Kurihara et al. | 264/572 |
| 5,776,412 | 7/1998 | Eckardt et al. | 264/572 |
| 5,849,377 | 12/1998 | Horikoshi et al. | 264/572 |

FOREIGN PATENT DOCUMENTS

| | | |
|---|---|---|
| 0 628 395 A1 | 12/1994 | European Pat. Off. . |
| 2 724 131 | 3/1996 | France . |
| 39 13 109 A1 | 10/1990 | Germany . |
| 43 36 243 A1 | 4/1995 | Germany . |
| 3121821 | 5/1991 | Japan . |
| 7124985 | 5/1995 | Japan . |
| 07 256684 | 10/1995 | Japan . |
| 1425837 | 2/1976 | United Kingdom . |

OTHER PUBLICATIONS

Jaroschek, et al., "Gasinnendruck zum Ausblasen überschüssiger Schmelze," pp. 873–876, *2376 Kunststoffe 80*, No. 8, Munchen, DE (Aug. 1990).

G. Steinbichler, "9.1 Hohlkörper–Spritzguss mit veränderbarem Formnestvolumen," *Spritzgiesstechnisches Kolloquium, TAK* (1990).

*Primary Examiner*—Jan H. Silbaugh
*Assistant Examiner*—Suzanne E. McDowell
*Attorney, Agent, or Firm*—Hamilton, Brook, Smith & Reynolds, P.C.

[57] ABSTRACT

A method and an apparatus are disclosed for producing plastic objects with solid regions and hollow regions. The method has the following steps: a) blocking off a part of the cavity (2) of a molding tool (1), so that little or no plastic melt can reach the blocked-off region (8); b) injecting plastic melt into the unblocked region (9) of the cavity (2) of the molding tool (1); c) releasing the blockage, so that plastic melt can reach the previously blocked-off region (8) of the cavity (2); d) injecting a pressurized gas into the melt by means of at least one fluid injection nozzle (7), so that the melt injected into the molding tool is distributed into the desired regions of the cavity (2) while forming a hollow space and is pressed against the cavity walls of the molding tool (1); e) allowing the molded part (6) to cool; f) relieving the cavity (2) of the pressure of the pressurized fluid; and g) demolding the molded part. The advantage achieved thereby is that solid regions and hollow regions are formed in the molded part in a predetermined manner.

9 Claims, 3 Drawing Sheets

METHOD AND APPARATUS FOR PRODUCING PLASTIC OBJECTS WITH SOLID SECTIONS AND HOLLOW SECTIONS

RELATED APPLICATION

This application is a Continuation of U.S. patent application Ser. No. 08/677,826 filed on Jul. 10, 1996, now U.S. Pat. No. 5,776,412, the entire teachings of which are incorporated herein by reference.

BACKGROUND OF THE INVENTION

U.S. Pat. No. 4,101,617 to Friederich discloses a method for producing plastic molded parts that have hollow sections using the so-called internal gas pressure method. An injection molding tool has a cavity, the walls of which define the surface of the part being produced. Plastic melt is injected into the closed tool through a plastic injection nozzle. Before the plastic melt hardens, a pressurized fluid, typically pressurized nitrogen gas, is injected into the interior of the plastic melt, so that the melt is pressed against the cavity walls thus forming hollow spaces. The gas pressure is maintained until the molded part cools down. The method advantageously achieves the result that the molded part is lighter, requires less plastic to produce, and has especially good surface characteristics, since the contraction of the material due to cooling is counteracted by the internal gas pressure. This effect prevents the formation of sink marks on the surface of the molded part.

The Friederich patent treats the simple case where the molded part being produced is essentially a tube that is to be formed as a hollow part by the internal gas pressure method. By analogy, the method can also be used to produce more complex molded parts having hollow regions as well as regions that are solid plastic.

SUMMARY OF THE INVENTION

One problem that arises, however, is that—regardless whether a particular volume of gas or gas under a defined pressure is injected into the melt—the dimensions of the gas bubble that forms in the interior, i.e., the hollow space in the interior of the molded body, is hard to reproduce consistently. The hollow space may be larger for one "shot" than for another, although the process parameters are the same. The parameters can only be held constant within the framework of a certain level of variation. The non-uniformities resulting from this variation lead to differently shaped hollow regions from workpiece to workpiece. This is especially disadvantageous in the case of parts for which the size of the hollow space produced by the internal gas pressure method must be precisely defined, certain regions needing to be solid for strength reasons while others being hollow for weight reasons.

The present invention concerns a method and an associated apparatus in which it is possible to produce molded parts by the internal gas pressure method, the molded parts having adjoining hollow and solid regions, but in which reliable and reproducible operation is achieved.

The invention achieves this result by blocking off a part of the cavity of a molding tool, so that no plastic melt can reach the blocked-off region. The plastic melt is then injected into the unblocked region of the cavity of the molding tool along a melt flow path, which extends from a plasticizing unit through a plastic injection nozzle into the molding tool.

The block is subsequently released, so that the plastic melt can reach the previously blocked-off region of the cavity. Simultaneously and/or subsequently to injecting the plastic melt, the pressurized fluid, especially pressurized gas, is injected into the melt by means of at least one fluid injection nozzle, so that the melt injected into the molding tool is distributed into the desired regions of the cavity. A hollow space is thus formed and the melt is pressed against the cavity walls of the molding tool. Once the molded part cools down to a temperature below the melting point of the plastic melt, the cavity is relieved of the pressure of the compressed fluid and the molded part demolded.

The method is therefore characterized in that first a divided-off region of the molded part or of the cavity is excepted from being filled with melt, while another region is filled. The division is then eliminated, allowing the melt to reach that previously divided-off region thereby creating the portion of the molded part that is supposed to be made solid. The redistribution of melt in the region of the cavity that has only now been released is accomplished by injecting pressurized gas into the melt which is initially situated in the filled region.

This has the advantageous effect that, without any other assisting devices—with the exception of a blocking element in the tool—and only by using that amount of melt which is needed to form the molded part, a workpiece can be produced which can be precisely defined with respect to the formation of the hollow space.

In specific embodiments, the method advantageously is further characterized in that the plastic melt of the process described above is injected until the unblocked region of the cavity is completely filled with plastic melt. Furthermore, the invention can provide that the blockage described above is not complete and, in order to avoid switch-over marks on the molded part, a small portion of plastic melt is allowed to penetrate into the blockedoff region.

In this process, the blocking and opening of the part of the cavity can be controlled or regulated. Advantageously, this is done in dependence on the time after the injection molding cycle begins or in dependence on the pressure in the cavity.

Still further, the region of blockage may be heated in order to avoid freezing.

In general according to another aspect, the invention is also directed to molding an apparatus. It comprises a molding tool, including at least two halves, with a cavity, a plasticizing unit, and a plastic injection nozzle that supplies plastic melt into the tool through at least one fluid injection nozzle.

The invention provides for means for essentially blocking off a part of the cavity whereby a slider element is used to block off a part of the cavity that is later withdrawn from it to release the melt into the previously blocked off region.

A further development of the invention provides that the means for blocking off a part of the cavity are influenced by control or regulation means. Finally, the invention can provide heat into the blocked-off region in order to stabilize the process.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE EMBODIMENTS

Figure 1:
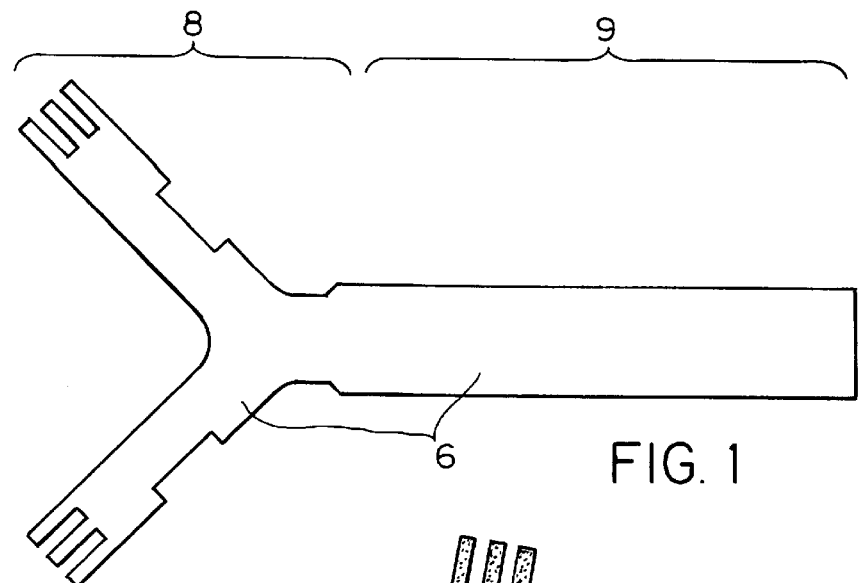
FIG. 1 shows a view of a molded part that is to be produced by the inventive method.

FIG. 1 shows an exemplary molded part 6, which is to be produced by the internal gas pressure method. It consists of two regions, namely of a region 8, which has two legs disposed essentially at a right angle to one another, and a region 9, which is longer and somewhat wider.

The two legs of the region 8 are used to fasten the molded part 6 into corresponding mounts, which are not shown. The molded part 6 must transmit forces with respect to these two mounts; consequently it must be made solid in region 8 for reasons of strength.

The longitudinal region 9 of the molded part 6, by contrast, is only of subordinate significance for the transmission of forces. On the other hand, in the final mounted state, it is visible in the subsequent application, and subsequently must have a good surface characteristic. For this reason, because no unnecessary plastic material should be consumed, and because the molded part 6 should be as light as possible, the region 9 of the molded part 6 is to be made hollow. The desired interior contour of the molded part is apparent from FIG. 3, which shows the molded part in cross-section. A hollow space extends essentially through region 9.

Figure 2:
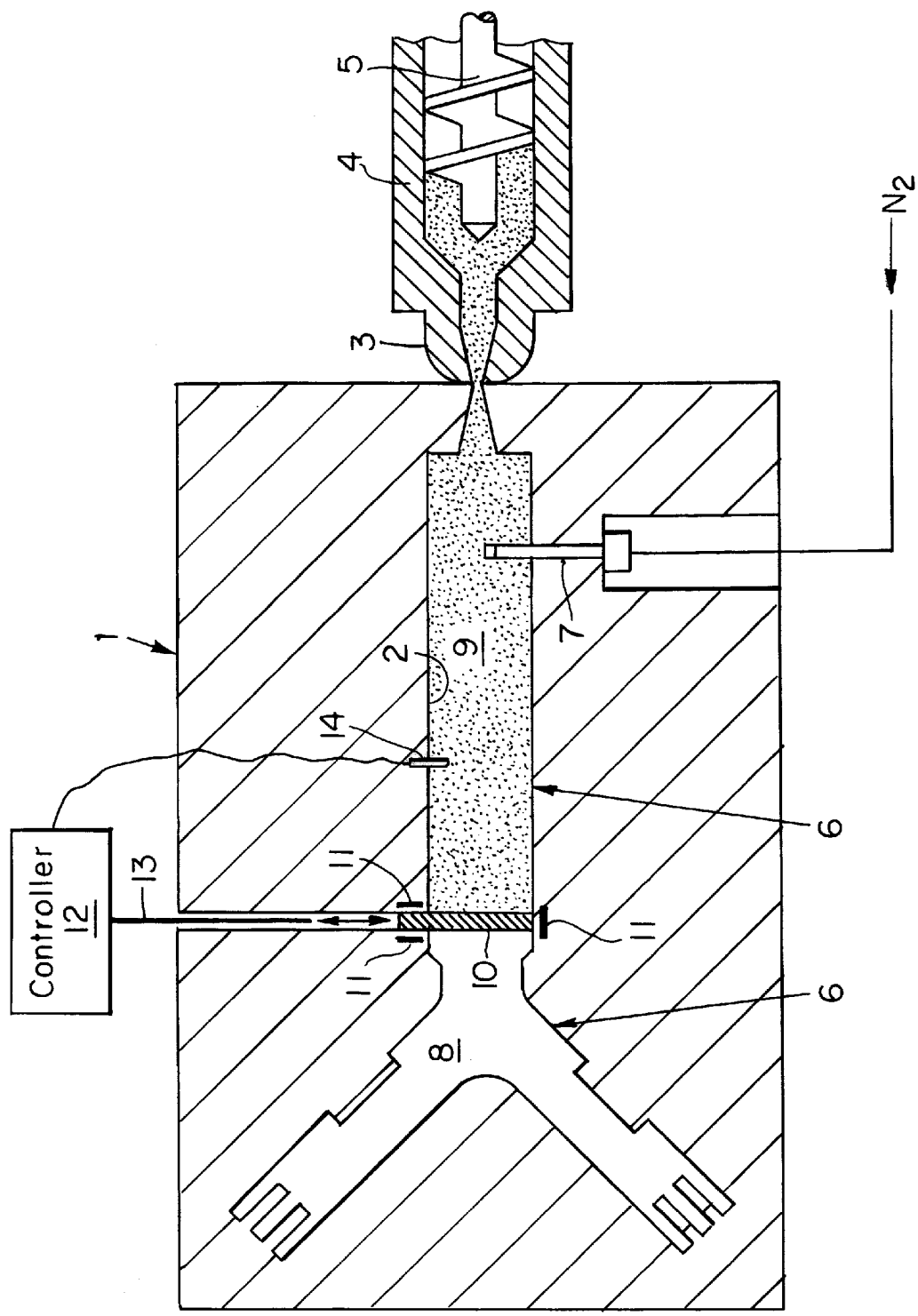
FIG. 2 shows an injection molding apparatus for producing this part of a first part of the process.

FIG. 2 schematically shows the inventive injection molding apparatus. The molding tool 1 has a cavity 2, the walls of which determine the contour of the molded part 6 that is being produced. Plastic melt is injected into the cavity 2. The plastic melt comes from a plasticizing unit 4, 5, which consists of a screw cylinder 4, in which a screw 5 moves rotationally and translationally. The plasticized melt reaches the cavity 2 via a plastic injection nozzle 3.

A fluid injection nozzle 7 is provided to inject pressurized fluid, usually pressurized nitrogen gas from an appropriate supply unit (not shown) into the interior of the still liquid plastic melt. In the present case, the fluid injection nozzle 7 is disposed so as to be movable along its longitudinal axis, so that it can be withdrawn for the purpose of demolding the finished molded part 6 from the cavity 2; the mechanism necessary for this is not shown. What is shown is the position in which pressurized gas is injected into the melt. The gas distributes the melt in the cavity 2 and presses it against the walls of the cavity 2 of the tool 1. Within the framework of the functional capability of the inventive method, the fluid injection nozzle 7 can be attached at an arbitrary point of the tool; for example, it can also be disposed concentric with the plastic injection nozzle 3, as a result of which melt and fluid are injected through the same tool opening. Instead of the fluid injection nozzle extending directly into the cavity, other known gasification elements can also be provided alternatively or in addition, e.g. fluid nozzles which are integrated into the plastic injection nozzle 3 or into the sprue. It can also be appropriate to use several fluid injection nozzles 7.

The region 8 of the molded part, which is intended to be essentially solid, and the region 9, which is intended to be essentially hollow, adjoin one another at one point, where a slider 10 adapted to block off a part of the cavity is disposed. This slider is actuated by actuator 13 so that it either extends into the cavity 2 or is withdrawn from it. This function is indicated by the double arrow above the slider 10.

Heater 11 is disposed in the region of the slider 10. These ensure that no "freezing" occurs in the region of the slider 10, so that the melt therefore does not cool there below its solidification point.

Figure 5:
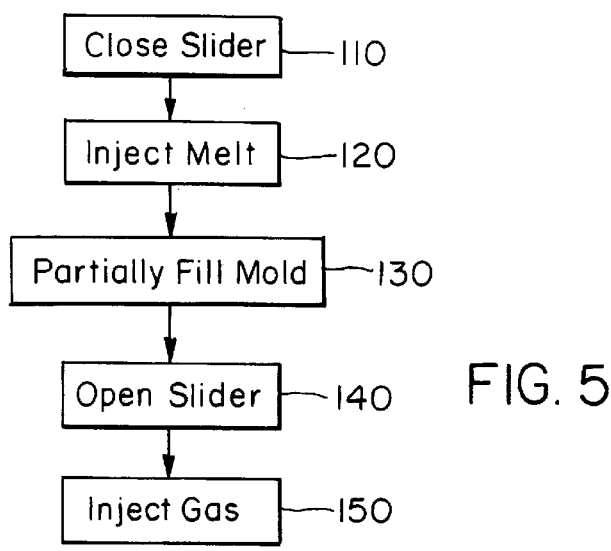
FIG. 5 is a flow diagram showing the inventive method.

FIG. 5 shows inventive production method.

First, the slider 10 is brought into the position where it blocks off a part of the cavity 2 step 110, namely the region 8 of the molded part 6; it is in the position shown in FIG. 2. Then melt is injected into the cavity by means of the plasticizing unit 4, 5 step 120. Because of the slider 10, the melt can fill only the region 9 of the cavity 2 or of the molded part 6, as can be seen in FIG. 2 (step 130). The unblocked region 9 preferably is initially filled completely with melt (see FIG. 2).

Alternatively pressurized gas may be injected by means of the fluid injection nozzle 7 while the melt is being injected into the cavity 9, so that a hollow space already forms in the interior of the melt.

Figure 3:
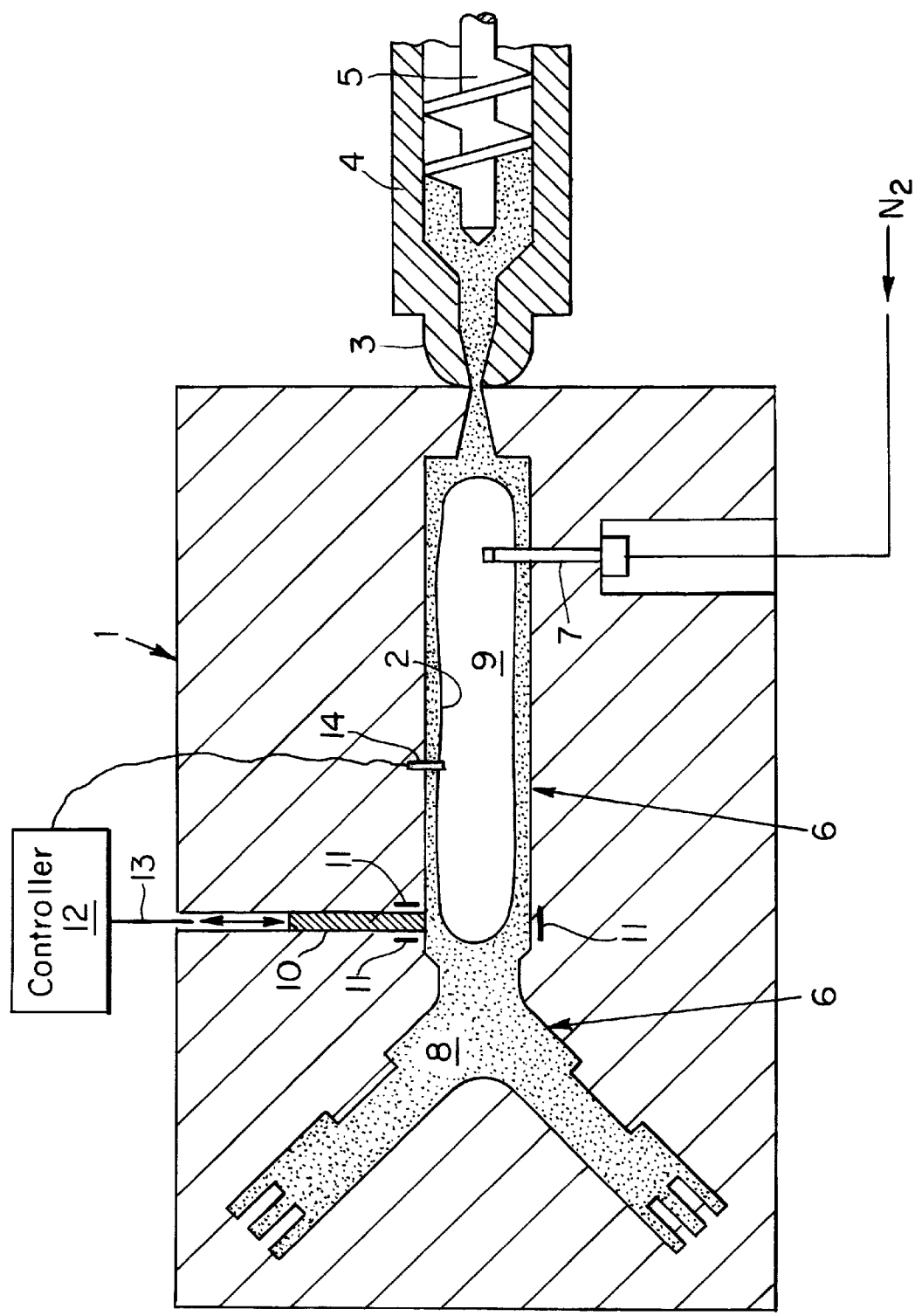
FIG. 3 shows the same injection molding apparatus at a later time during the process.

When the region 9 is completely filled with melt, or when sufficient melt has been injected in accordance with the cycle, the previously blocked-off region 8 of the cavity 2 and of the molded part 6 is released; the slider 10 is raised into the position shown in FIG. 3 (step 140).

Preferably at this moment pressurized gas begins to be injected via the fluid injection nozzle 7 (step 150). In this way, still liquid plastic material is displaced into the region 8 while forming a hollow space in region 9. Region 8 subsequently fills completely with melt. However, the time when gas injection begins can also occur before or after the time when the slider 10 is opened.

In every case, the essential point of the invention is that a significant part of the molded part or of the cavity volume is blocked off before injecting the melt, and another significant part of the volume is filled with melt, at least partially. Only then is the block released, so that melt can reach those component regions which previously have been blocked off; a portion of the driving force for driving the melt into the previously blocked-off region comes from the pressurized fluid injected into the unblocked region.

The slider 10 can be pushed into the cavity 2 by actuator 13 in such a way that it does not cause a complete blockage but rather a small portion of the melt can reach the blocked-off region even before the slider 10 is withdrawn. This achieves the result of eliminating the risk of a switch-over mark forming at the attachment point of the lower part of the slider 10 on the corresponding point of the cavity wall, that is a mark which will produce an imperfect surface on the subsequent molded part 6.

The essential point in all cases is only that the means for blocking off a part of the cavity (slider 10) are create a flow resistance in the interior of the cavity against the flow of plastic melt. This achieves the result that, in a first process step, plastic melt first collects in a region 9 before the melt can also reach region 8 only after the flow resistance has been eliminated.

The actuator 13 of the means to create the flow resistance in the cavity can be controlled or regulated by controller 12.

That is, the slider 10 can be activated in dependence on measured process variables, e.g., pressure in the cavity 2 as detected by pressure transducer 14. Alternatively, the controller 12 can operate the activator 13 in dependence on prescribed parameters, e.g. lapse of a defined time since the beginning of the cycle.

Figure 4:
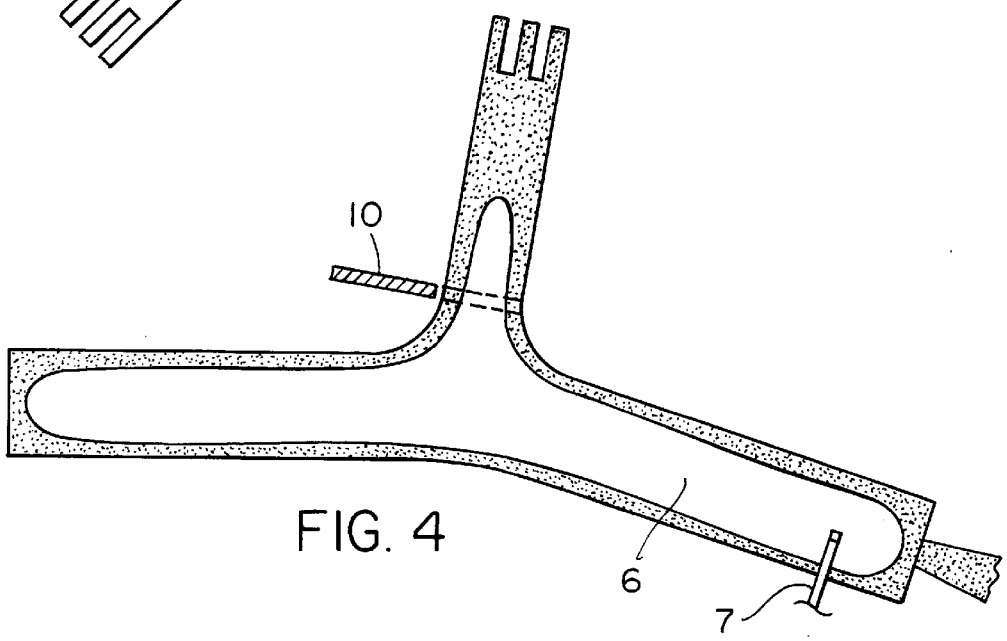
FIG. 4 schematically shows another molded part, which has been produced by the inventive methods.

FIG. 4 shows another molded part 6, which has been produced by the inventive method. The chosen sectional representation shows how, in this case, the cavity has formed in the interior of the molded part 6. This example shows that the slider 10 need not necessarily represent the separation between that region of the molded part that is to be solid and that region that is to be hollow. In the present case, a gas bubble—after the appropriately blocked-off cavity region has been released by the slider 10—rather has also penetrated into the region which initially was blocked off. Alternatively to this, substantial parts of the initially unblocked region can also be made solid.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A method for producing plastic molded parts with solid regions and hollow spaces, comprising:

blocking off a portion of a cavity of a molding tool;

injecting plastic melt into an unblocked portion, but not a blocked-off portion, of the cavity of the molding tool along a melt flow path, which extends from a plasticizing unit through a plastic injection nozzle into the molding tool;

injecting the plastic melt until the unblocked portion of the cavity is filled with plastic melt;

unblocking the cavity enabling the plastic melt to reach the previously blocked-off portion of the cavity;

simultaneously and/or subsequently to injecting the plastic melt, injecting a pressurized fluid into the melt via at least one fluid injection nozzle, so that the melt injected into the molding tool is distributed in the cavity;

forming a hollow space in the unblocked portion of the cavity by pressing the melt against cavity walls of the molding tool;

forming a substantially solid plastic section in the previously blocked-off portion of the cavity;

allowing a molded part thus produced to cool down to a temperature below the melting point of the plastic melt;

relieving the cavity of the pressure of the pressurized fluid; and demolding the molded part.

2. The method of claim 1 wherein the step of blocking off the portion of the cavity comprises incompletely blocking the plastic melt from entering the blocked-off portion of the cavity to avoid switch-over marks on the molded part.

3. The method of claim 1, wherein the blocking and opening of the blocked-off portion of the cavity is controlled or regulated.

4. The method of claim 1, wherein the blocking and/or unblocking of the blocked-off portion of the cavity is controlled or regulated in dependence on the time after plastic melt injection begins and/or in dependence on the pressure in the cavity.

5. A method for producing plastic molded parts, comprising:

at least partially dividing a cavity of a molding tool into a first portion and a second portion;

injecting plastic melt into the first portion of the cavity of the molding tool until the first portion of the cavity is at least partially filled, while at least partially blocking the plastic melt from flowing into the second portion of the cavity;

after at least partially filling the first portion, unblocking the cavity, thereby further enabling the plastic melt to reach the second portion of the cavity;

injecting a pressurized fluid into the plastic melt to distribute the plastic melt in the cavity and form a hollow space in the first portion of the cavity and a substantially solid plastic section in the second portion of the cavity; and demolding the molded part.

6. The method of claim 5, wherein the step of dividing the cavity comprises completely blocking the plastic melt from entering the second portion of the cavity.

7. The method of claim 5, further comprising controlling the unblocking of the cavity in response to time delay after plastic melt injection begins.

8. The method of claim 5, further comprising unblocking the cavity in response to the pressure in the cavity.

9. The method of claim 5, wherein the step of injecting plastic melt into the first portion of the cavity comprises completely filling the first portion of the cavity.

* * * * *